O. A. FRICK.
WHEEL CONSTRUCTION.
APPLICATION FILED OCT. 23, 1909.
962,207.
Patented June 21, 1910.
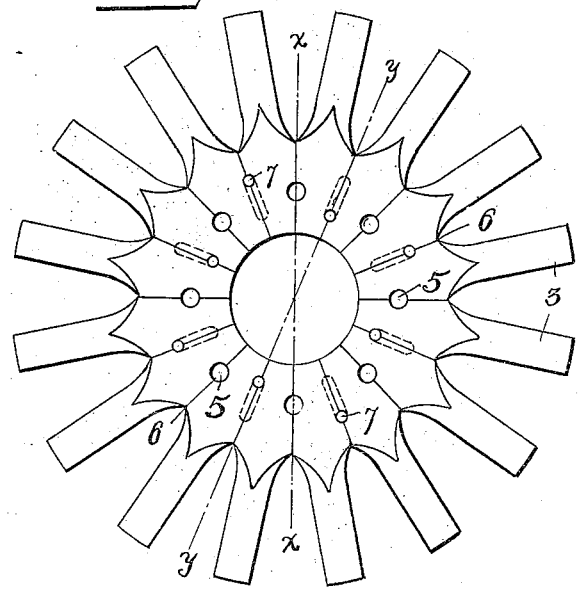
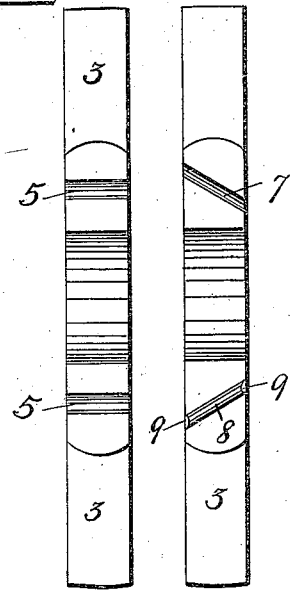
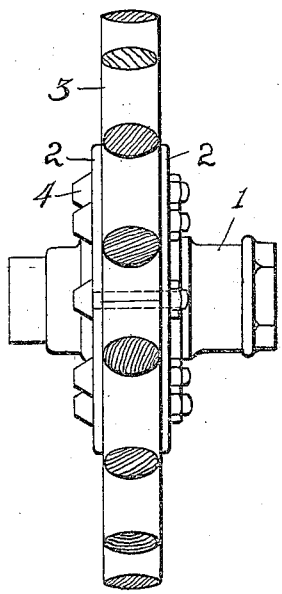
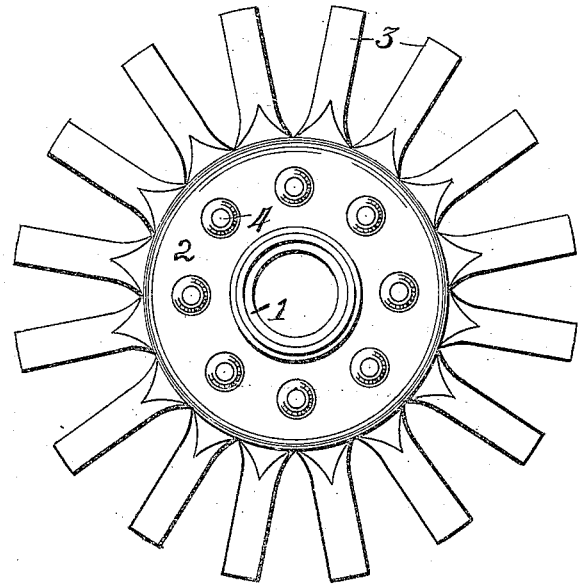
WITNESSES:
C. H. Bills.
E. E. Thomas.
INVENTOR.
Orlando A. Frick,
By Owen & Owen,
His attys.

UNITED STATES PATENT OFFICE.

ORLANDO A. FRICK, OF DEFIANCE, OHIO, ASSIGNOR TO THE TURNBULL WAGON COMPANY, OF DEFIANCE, OHIO, A CORPORATION OF OHIO.

WHEEL CONSTRUCTION.

962,207.  Specification of Letters Patent.  Patented June 21, 1910.

Application filed October 23, 1909. Serial No. 524,267.

*To all whom it may concern:*

Be it known that I, ORLANDO A. FRICK, a citizen of the United States, and a resident of Defiance, in the county of Defiance and State of Ohio, have invented a certain new and useful Wheel Construction; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to wheels and more particularly to the hub construction thereof; and has for its object the provision of simple, efficient and inexpensive means for preventing a wrenching or relative shearing or sliding action of the hub ends of spokes when opposing turning stresses are applied to the hub and rim portions of the wheel, as is particularly the case during the starting or stopping of a vehicle, and also for coöperating with the hub flange to prevent relative lateral movements of the hub ends of the spokes. In wheels of this class it is customary to ship the same with the hubs and hub flanges removed therefrom, and with the ordinary construction of wheels considerable difficulty is experienced due to the spokes of the wheel skeleton or spoke portion becoming accidentally broken apart or separated during transit or handling, or by forcing the hub sleeve within the hub opening thereof.

A further object of my invention is to provide a wheel which will stand up during shipping or handling and while forcing the hub sleeve therein and thus avoid the objections and difficulties above noted.

The operation, construction and arrangement of the parts of the invention are fully described in the following specification, and a preferred embodiment of the same illustrated in the accompanying drawings, in which,—

Figure 1 is a side view of the hub portion of a wheel with the flanges and spindle box removed. Figs. 2 and 3 are sections of the same on the lines $x$ $x$ and $y$ $y$, respectively, in Fig. 1, and Figs. 4 and 5 are different views thereof with the flanges and spindle box in position.

Referring to the drawings, 1 designates the hub or spindle box, 2, 2 the opposing flanges carried thereby, and 3 the spokes, the hub ends of which are gripped between the flanges 2 by the coöperating section of the flange bolts 4. These bolts pass through apertures 5 provided in alternating ones of the seams 6 formed by the abutting sides of the hub ends of the spokes, as is customary in wheels of this type. With this construction of wheel it is found that the bolts 4 do not fit tightly enough in their spoke sockets to prevent a relative wrenching or longitudinal sliding of the abutting spoke ends when a sudden strain, such as is occasioned by a starting or stopping of a motor driven vehicle, is applied to the wheels, nor is it found to be practical to fit the bolts so tightly in their sockets as to prevent such movements of the spokes. In order to overcome this objectionable feature I provide one or both of the inner faces of the hub end of each spoke with a transversely disposed groove 7, which registers with the corresponding groove of an abutting spoke to form a socket between such spokes for the insertion of a key 8, which is glued or otherwise rigidly secured therein. The key sockets are preferably inclined relative to the wheel axis, as it is found that when disposed parallel to the axis the keys sometimes become sheared by the relative sliding or shearing action of the spokes when the wheels are subjected to undue stresses, and the inclination of the sockets is preferably reversed for alternate ones, as shown. The keys when inserted into the spokes on an incline in addition to preventing any shearing or wrenching action of the spokes, also effectually prevent relative lateral movements of the inner spoke ends and provide a wheel which is exceptionally strong when the hub sleeve and flanges are removed.

The keys 8 are preferably of wood, and, as wood is subject to the greatest compression transversely of the grain, the ends of such keys are made to terminate short of or are countersunk relative the outer sides of the spokes, as shown at 9, to prevent such ends from projecting beyond the ends of the sockets and holding the flanges out of contact with the spoke sides when the spokes become contracted or compressed. It is found with this manner of keying the spokes that the same are effectually prevented from wrenching or relative movements either longitudinally or laterally, and that a maximum of strength is obtained with a minimum of cost and material.

I wish it understood that my invention is not limited to any specific construction and arrangement of the parts except in so far as such limitations are specified in the claims.

Having thus described my invention, what I claim as new and desire to secure by Letters Patent, is,—

1. In a wheel the combination with the inner hub end portions of the spokes having flat lateral abutting surfaces and sockets provided within the seams formed by such surfaces, of keys inserted within said sockets and disposed at an incline relative to the wheel axis, alternate of said keys being oppositely inclined substantially as and for the purpose set forth.

2. In a wheel, the combination with the laterally abutting hub ends of spokes, of keys inserted on an incline between the abutting faces of such spokes and rigidly secured therein.

3. In a wheel, the combination with the laterally abutting hub ends of spokes, of keys inserted between the abutting ends of such spokes to lock the same against relative longitudinal and lateral movements, the alternate keys being inclined in different directions relative to the wheel axis.

4. In a wheel, the combination with the laterally abutting hub ends of spokes having sockets provided transversely therebetween and inclined relative to the wheel axis, the inclination of alternate sockets being reversed, of wooden keys secured within such sockets and having their ends countersunk relative to the faces of the spokes, substantially as described.

In testimony whereof, I have hereunto signed my name to this specification in the presence of two subscribing witnesses.

ORLANDO A. FRICK.

Witnesses:
 GEO. H. ROBERTS,
 A. H. WOOD.